United States Patent [19]
Svensson

[11] Patent Number: 5,841,104
[45] Date of Patent: Nov. 24, 1998

[54] METHOD AND SYSTEM FOR MULTIPLE PASS WELDING

[75] Inventor: Tommy Svensson, Ft. Collins, Colo.

[73] Assignee: ABB Flexible Automation, Inc., New Berlin, Wis.

[21] Appl. No.: 707,275

[22] Filed: Sep. 3, 1996

[51] Int. Cl.⁶ .................................................. B23K 9/127
[52] U.S. Cl. ......................................... 219/125.1; 901/42
[58] Field of Search ........................... 219/125.1, 125.11, 219/124.34; 901/42

[56] References Cited

U.S. PATENT DOCUMENTS

| | | | |
|---|---|---|---|
| 4,448,342 | 5/1984 | Abe et al. | 219/125.1 |
| 4,477,712 | 10/1984 | Lillquist et al. | 219/124.34 |
| 4,491,266 | 1/1985 | Abe et al. | 219/124.34 |
| 4,508,953 | 4/1985 | Murakami et al. | 219/125.1 |
| 4,613,743 | 9/1986 | Nied et al. | 219/130.21 |
| 4,629,860 | 12/1986 | Lindbom | 219/125.1 |
| 4,742,207 | 5/1988 | Nakashima et al. | 219/125.1 |
| 4,937,426 | 6/1990 | Nishikawa et al. | 219/124.34 |
| 5,013,887 | 5/1991 | Gold | 219/124.34 |
| 5,066,848 | 11/1991 | Nishikawa et al. | 219/124.34 |
| 5,170,034 | 12/1992 | Seshimo et al. | 219/125.1 |
| 5,173,592 | 12/1992 | Okumura et al. | 219/125.1 |

OTHER PUBLICATIONS

Rapid Reference Manual, Article 3HAB 5815–1.

*Primary Examiner*—Clifford C. Shaw
*Attorney, Agent, or Firm*—Godfrey & Kahn, S.C.

[57] ABSTRACT

A method and system for multiple pass welding that includes a welding torch mounted on the arm of an industrial robot. The robot has a data processor with a memory and the coordinates of a first path are inputted to the data processor and are stored in the memory. The welding torch is then moved along the first path by the robot to make a first weld of a workpiece (or workpieces). A second weld of the workpiece is made by moving the welding torch along a second path which is offset from the first by a predetermined positional increment. The positional increment is established by positional coordinate increments which are inputted to the data processor by a robot user before or after the first weld has been made. The user may also input a weld torch angle increment to change the angle of the welding torch with respect to the first path. Subsequent welding passes are made by moving the welding torch along additional paths which are also offset from the first path.

6 Claims, 2 Drawing Sheets

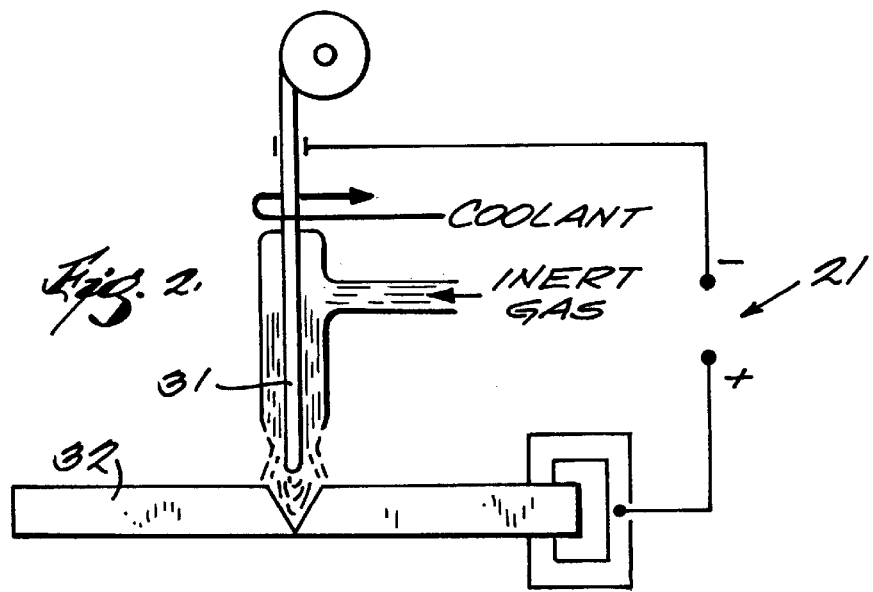
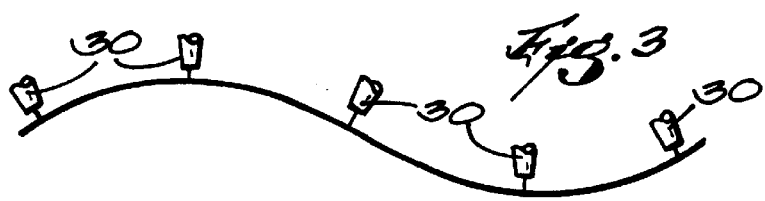
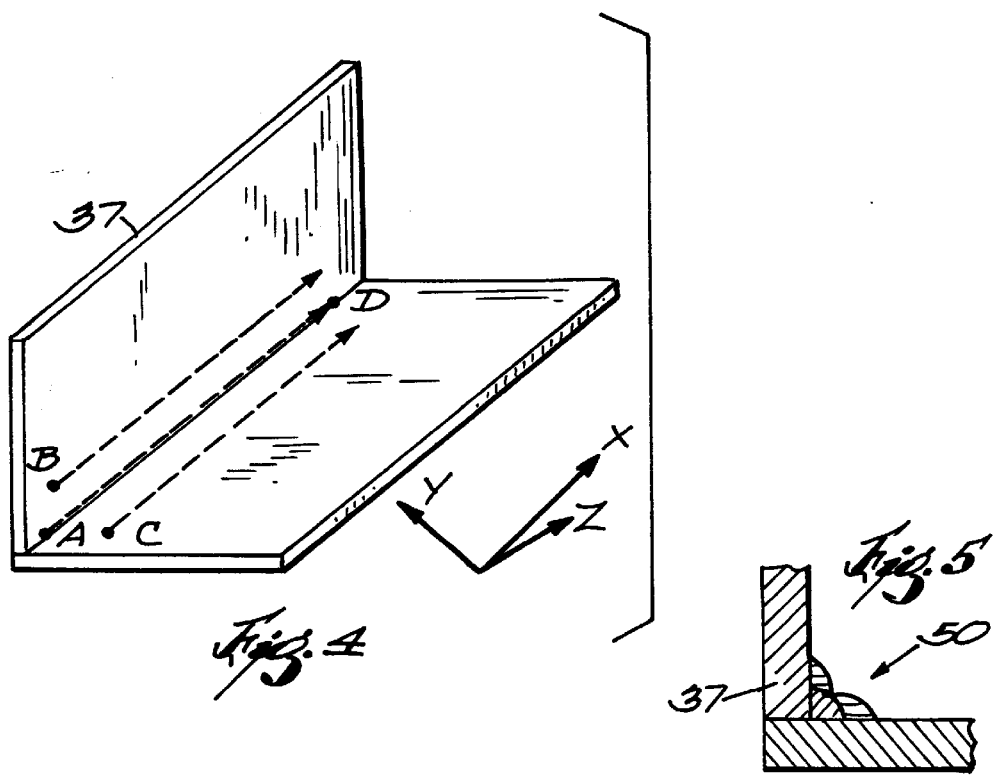

METHOD AND SYSTEM FOR MULTIPLE PASS WELDING

BACKGROUND OF THE INVENTION

The present invention relates to a method and system for multiple pass welding. More particularly, the present invention relates to a method and system for welding where multiple welds to a workpiece are made using a programmable, industrial robot.

Fusion welding is a known process in which metals are heated to their melting temperature and are then joined. In most types of fusion welding, the joint between the metals is formed using a filler metal in the form of a rod or wire. One of the most widely used welding techniques is arc welding. In arc welding an electric arc is used to melt the workpiece and the filler metal. It is common for the arc to be formed between a metal electrode, which gradually melts away to supply the filler metal, and the workpiece.

In the manufacture of many goods, welding is carried out by programmable, industrial robots. As might be expected, many of the challenges in robotics involve developing robot systems which carry out known manual welding techniques. Once robotic methods and systems are developed that can imitate manual welding techniques, the advantages of robotic welding, higher and otherwise unachievable accuracy, speed, and endurance, can be exploited.

In some circumstances, a single weld (which creates a single bead of filler material) is not sufficient to create a joint of sufficient strength. As a result, multiple passes or multiple bead welds are required to create suitable joints. There are manual techniques for creating such multiple bead welds. However, present robotic systems are either incapable of creating multiple bead welds or produce welds which are unsatisfactory.

Accordingly there is a need for improved robotic methods and systems which permit multiple welds to be made. In particular, there is a need for a welding method and system where multiple passes of a welding torch, which is mounted on a robot, may be made with respect to a workpiece so that multiple welds, which are offset from an initial weld, may be made to the workpiece.

OBJECTS AND SUMMARY OF THE INVENTION

Therefore, it is an object of the present invention to provide a method and system for multiple pass welding where multiple welds are made to a workpiece by a programmable, industrial robot.

A further object of the present invention is to provide a method and system for multiple pass welding where the positional coordinates of a first welding pass or path are recorded in the memory of a programmable, industrial robot and the path coordinates and torch angle setting for a second-welding path, offset from the first, are inputted to the programmable robot by a robot user.

These and other objects are achieved in a novel method and system for multiple pass welding. The system includes a welding torch mounted on the arm of an industrial robot. The robot has a data processor having a memory. The coordinates of a first path are inputted to the data processor and are stored in the memory. The welding torch is then moved along the first path by the robot to make a first weld of a workpiece (or workpieces). A second weld of the workpiece is made by moving the welding torch along a second path which is offset from the first by a predetermined positional increment. The positional increment is established by positional coordinate increments which are inputted to the data processor by a robot user after the first weld has been made. The user may also input a weld torch angle increment to change the angle of the welding torch with respect to the first path. Subsequent welding passes are made by moving the welding torch along additional paths which are also offset from the first path.

Further objects and advantages of the present invention will become more apparent from the following detailed description of the invention taken in combination with the accompanying drawings.

BRIEF DESCRIPTION OF THE DRAWINGS

FIG. 2 is schematic, side view of a shielded, arc welding process.

FIG. 3. is a schematic diagram showing the orientation of the welding torch with respect to the weld path under specified programming conditions.

FIG. 4. is an enlarged, partial view of the welding station of FIG. 1. showing a workpiece to be welded together and exemplary paths along which the welding torch mounted to the robot arm of the programmable, industrial robot will travel. For convenience an XYZ coordinate system is shown to indicate the direction of travel of the welding torch.

FIG. 5 is a cross sectional view of a multiple pass or bead weld.

DETAILED DESCRIPTION OF THE INVENTION

Figure 1:
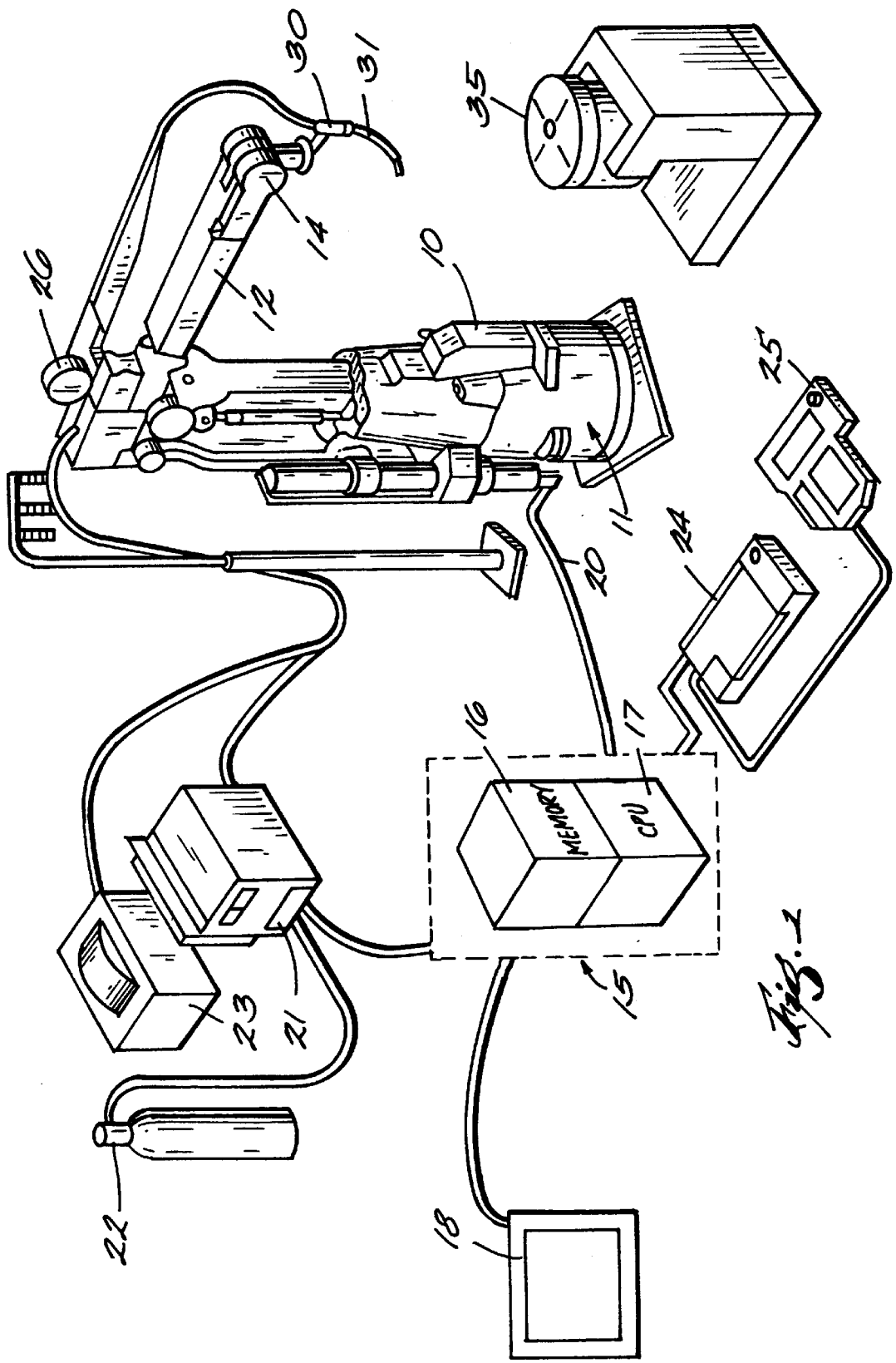
FIG. 1 is a perspective view of a welding station showing a programmable, industrial robot having a robot arm with a welding torch mounted to it and a data processor coupled in data communication relation to the robot.

A programmable industrial robot 10 having a base 11, an arm 12, and a wrist 14 is shown in FIG. 1. Controlling the robot 10 is a data processor 15 or other means for processing data, which may be one of many known programmable computers. The data processor 15 includes a memory 16 (shown schematically) and a central processing unit 17 (shown schematically), and may be coupled to a video monitor 18. The data processor and memory are coupled in data communication relation to the robot through a connector 20. The data processor 15 may also be coupled to an electric power source 21 which supplies electric power to the robot 10. Inert gas is supplied to the robot from a gas source 22 and filler wire is supplied from a first spool 23. Various inputs to the data processor 15 may be made by means of a keyboard 24 and a teach pendant 25.

Mounted on the robot wrist 14 is a welding torch 30. The welding torch 30 includes an electrode 31 in the form of a wire fed from a wheel 26. The first spool 23 controls the rate of filler wire feed to the welding torch 30.

As shown schematically in FIG. 2, the electrode 31 is coupled to the electric power source 21, so as to create an electrical arc between the electrode and a workpiece 32 being welded. A table 35 (FIG. 1) is typically provided to appropriately position an article to be welded, such as a second workpiece 37 (FIGS. 4 and 5), within reach of the robot 10.

Once an arc is created between the workpiece and the electrode, the position of the arc is tracked using a through-the-arc seam tracker. Suitable through-the-arc seam trackers are available through various commercial suppliers and are well known in the art. While it is preferable that a tracking system be used, if seam (i.e., weld) consistency can be maintained in a weld process, multiple pass welds may be made without such a tracking system.

OPERATION

The present invention is designed to simplify the complexity of programming an industrial robot so that it will carry out multiple weld passes, offset from a single root pass. The present invention includes software which is written in the language RAPID. The software of the present invention is designed to enhance existing software known as ARCWARE software. Background information on the RAPID language and ARCWARE software is available from various commercial suppliers including ABB Flexible Automation, Inc., Fort Collins, Colo. Specific information may be obtained in the RAPID Reference Manual, Article No. 3HAB 5815-1, available from ABB Flexible Automation, Inc., which is hereby incorporated by reference. A fundamental understanding of the language and software is assumed in the description that follows.

RAPID software allows operators to select various instructions which correspond to the type of robot tool movement desired. Among the instructions available in the RAPID language for controlling the movement of robot tools, such as a welding torches, are the following:

ARCL: This instruction refers to arc welding type welds which are completed in a linear direction. The instruction is used to define weld starts and stops.

ARCC: This instruction refers to arc welding type welds which are completed in a circular direction. To program a circular or curved path, the ARCL instruction is used to select the start point of the path, then the ARCC instruction is used to input arc (i.e. curve) references which the robot will use to move its arm. The ARCC instruction permits movements to be controlled in half circles.

The software of the present invention is designed to permit an operator or user to program a root pass or first path using special instructions. These instructions represent the start and end of the first path and are designed to work together to record and store this path. The operator uses another instruction to replay the stored path in either the forward or reverse direction with specific offsets. The operator has the opportunity to offset the stored path in one or two directions. It should be understood that welding is typically viewed with respect to a three axis coordinate system ("seam coordinates") aligned so that the X axis corresponds to the positional direction of welding. The Y and Z axes are perpendicular to the X axis and to each other, and offsets are made along the Y and Z axes. In addition to programming an offset for welding paths subsequent to a root path, the operator may also change the angle of the welding torch 30, if so desired.

The instruction defining the start or starting point of the root or first path is ArcStartPth. The instruction is a substitute for the normally used ARCL instruction, and is a routine or procedure. Therefore, it must be accessed through the use of the "ProcCall" (or procedure call) instruction. The ArcStartPth instruction can be added to a PIC list (or pick list, which is an easily computer accessed list of predefined or user programmed instructions) and is defined as follows:

---

ArcStartPth*, 10, v50, sm1, wd5, wvWG, tWeldGun, wobjO;

---

Parameters:

(*) Start point of the weld path to be stored;
Data type; robtarget.
(10) Spacing in millimeters for the storing of positions along the
(root or subsequent) path to be recorded.
Data type; num
(v50) Velocity of the TCP (tool, in this case the welding torch 30,
centre point) when executed forward in step mode. In step mode, the robot pauses at each point in a path until a prompt input is received telling the robot to move to the next position.
Data type; speeddata.
(sm1) Seam data to be used for the weld.
Data type; seamdata.
(wd5) Weld data to be used for the weld.
Data type; welddata
(wvWG) Weave data to be used for the weld.
Data type; weavedata.
(tWeldGun) Designates the tool with which the (root or subsequent) path
is to be executed with.
Data type; tooldata.
(wobjO) The work object data to be used for the workpiece to be welded. If no work object is desired, then wobjO should be used.
Data type; wobjdata.

---

ArcStartPth is used in conjunction with ArcEndPth (defined below) to record and store the root path, or any single path, by measuring tool centre point ("TCP") positional information and storing positions at a specified spacing along the programmed path. Because the stored positions along the path are actually averages of left and right weave positions, the ArcStartPth instruction must be used with a weave data other than "Zero," and the spacing of the stored positions must be greater than the weave length. It should be understood that weaving is a zigzag movement superimposed on the basic path followed by a robot arm and the shape of the weave pattern is defined by weave length, height, and width.

The "zone" of the path is hard coded as fine. As used herein, the term "zone" refers to the spherical space that surrounds a "fly-by point." A "fly-by point" is a point which the robot moves an end effector near to, or in the vicinity of, but not through. How close the robot moves the end effector to the fly-by point depends on the size of the zone. A zone coded as fine is relatively small.

The instruction defining the end or end point of a weld path is ArcEndPth. This instruction is a substitute for the normally used ARCL instruction, and is a procedure. Therefore, like the ArcStartPth instruction, it must be accessed through the use of the "ProcCall" instruction. This instruction may be added to the PIC list, if desired, and is defined as follows:

---

ArcEndPth*, 1, v50, sm1, wd5, wvWG, tWeldGun, wobjO;

---

Parameters:

(*) End point of the weld (root) path to be stored.
Data type; robtarget
(1) The path number of the path (root or subsequent path) being
stored.
Data type; num
(v50) Velocity of the TCP when executed forward in step mode.

-continued

ArcEndPth*, 1, v50, sm1, wd5, wvWG, tWeldGun, wobjO;

Parameters:

|  | Data type; speeddata. |
| --- | --- |
| (sm1) | Seam data to be used for the weld. |
|  | Data type; seamdata |
| (wd5) | Weld data to be used for the weld. |
|  | Data type; welddata |
| (wvWG) | Weave data to be used for the weld. |
|  | Data type; weavedata |
| (tWeldGun) | The tool with which the path is to be executed. |
|  | Data type; tooldata |
| (wobjO) | The work object data to be used for the workpiece to be welded. If no work object is desired, the wobjO should be used. |
|  | Data type; wobjdata |

An optional argument, \No Align, may be added to the ArcEndPth instruction. If this optional argument is not added to the instruction, the orientation of the welding torch 30 will change to keep a constant torch angle with respect to the weld line throughout the duration of a particular weld. This is shown in FIG. 3. If this optional argument is added to the instruction, the torch angles will stay as they were programmed through the path.

As noted above, the ArcEndPth and ArcStartPth are used in conjunction with one another to record and store a path by measuring TCP (tool center point) positional information and storing positions at a specified spacing along the programmed path. As with the ArcStartPth instruction, the programmer must use a weave data other than "Zero" when using the ArcEndPth instruction. The zone is hard coded as fine and the path is stored without program placement. Program placement refers to an option of the present invention that permits the recordation of a path to be carried out with an offset. Thus, for example, it would be possible for a welding torch to move along a path, while the robot stores not the actual path of movement, but a path offset from the actual path. In this way, an offset can be added to a desired path as it is recorded so that subsequent welds can be made without later adding an offset.

Once the first path has been executed, i.e., once the first weld has been made as programmed using the instructions set out above, the second or next path must be executed. The instruction used to execute passes subsequent to the first or root path is MultiRePlay. MultiRePlay is used to repeat a stored path with an offset in the Z and Y axes with respect to Seam coordinates. As noted above, in Seam coordinates, the X axis is parallel to the seam or weld, and the positive X direction corresponds to the direction of travel of the welding torch 30. The Y axis is perpendicular to the X axis, and the positive Y direction is to the left when referenced to the start point of the weld, looking in the positive X direction. The Z axis is parallel to the welding torch 30, and the positive Z direction is away from the seam.

The MultiRePlay instruction is a procedure which must be accessed through the use of the "ProCall" instruction and is defined as follows:

MultiRePlay 1, 2, pose 1, sm1, wd5, wvφ;

Parameters:

| (1) | The stored path to be repeated. |
| --- | --- |
|  | Data type; num |

-continued

MultiRePlay 1, 2, pose 1, sm1, wd5, wvφ;

Parameters:

| (2) | The layer offset that will be visible at the start and the end of the path. |
| --- | --- |
|  | Data type; num |
| (pose1) | A storage location for the offset information pertaining to the repeated path. |
|  | Data type; pose |
| (sm1) | The seam data to be used in the offset weld. |
|  | Data type; seamdata |
| (wd5) | The weld data to be used in the offset weld. |
|  | Data type; welddata |
| (wvφ) | The weave data to be used in the offset weld. |
|  | Data type; weavedata |
| (tWeldGun) | The tool to be used for the offset weld. (Must be the same as the one used to program the stored path to the offset). |
|  | Data type; tooldata |
| (wobjφ) | The work object data for the offset weld. (Must be the same as the one used to program the stored path to be offset). |
|  | Data type; wobjdata |

An optional argument, Reversed, may be added to the MultiRePlay instruction. If this optional argument is added to the instruction the stored path will be repeated in the opposite direction from that which it was programmed.

The present invention does not require that the replayed passes be weaved since the path storage is done on the root pass. However, the replayed passes may be weaved if so desired in order to make a large weld or cover a wide path.

The root and subsequent paths followed by the robot 10 to create a multiple bead weld are shown in FIG. 4. In FIG. 4, point A is representative of a location where the ArcStartPth robot target position would be programmed. Point D is representative of a location where the ArcEndPth robot target position would be programmed. Point B is representative of the start point of a MultiRePlay of the root path with a positive Z axis and a positive Y axis offset. Point C is representative of the start point of a MultiRePlay of the root path with a positive Z axis and a negative Y axis offset. Thus, using the present invention a multiple bead weld, such as the weld 50 shown in FIG. 5, can be achieved.

The present invention may be better understood by reference to the following example program.

EXAMPLE 1

MoveL *, v1000, fine, tWeldGun;

| (A) | ArcStartPth *, 10, v200, sm1, wd5, wvWG, tWeldGun, wobjO; |
| --- | --- |
| (B) | ArcL *, v200, sm1, wd5, wvWG, z5, tWeldGun; |
| (C) | ArcEndPth *, 1, v200, sm1, wd5, wvWG, tWeldGun, wobjO; |
| (D) | MultiRePlay\Reversed, 1, pose1, sm1, wdNew, wvO, tWeldGun, wobjO; |
| (E) | MultiRePlay 1, 1, pose2, sm1, wdNew, wvO, tWeldGun, wobjO; |
|  | MoveL *, v1000, fine, tWeldGun; |

In the example program, the root path is recorded and stored using stored positions at a spacing of 10 millimeters along the entire distance of the programmed weld path. This root path is given the path number "1." The first MultiRePlay instruction will replay the first path (i.e., path 1) in a reverse direction with a layer offset of (1) x spacing (10 mm), at both ends of the weld, and will store the Z offset, Y offset, X rotation, and Y rotation, programmed by the operator in the parameter pose1. A layer offset refers to the starting and ending position of a non-root path along the direction (X axis in seam coordinates) of the root path. When offset from the root path a subsequent path will start (or end) a predetermined amount from, toward the median, of the starting (or ending) point of the root path. The X and Y rotation determine the angle of the welding torch 30.

The second MultiRePlay instruction will replay the first path (path 1) in the forward direction with a layer offset of (1) x spacing, (10 mm), at both ends of the weld, and will store the Z offset, Y offset, X rotation, and Y rotation, programmed by the operator in the parameter pose2.

The layer offset is an offset in the X axis and must be a value other than zero. If a smaller layer offset is desired, then a smaller spacing of stored positions must be used in the ArcStartPth instruction. However, the spacing of stored positions must also be greater than the weave length. Therefore, there must always be some layer offset.

In the embodiment shown and described, the maximum number of paths allowable in memory at one time is four. However, the same path number may be used for several different welds because every time the path is used, its stored positions are overwritten. The MultiRePlay instruction then uses the new path information to repeat the root path.

The data defined by the "pose" parameters, is different than the other data in the MultiRePlay instruction. An infinite amount of pose data may be created, and it is recommended that different pose data be used for every offset pass, because the pose data contains offset and torch rotation information for a particular subsequent pass with respect to a particular root path. The offsets and torch angles for a subsequent path (or single replay) will likely be different from the offsets and torch angles of another replay of the same root path. If the same pose data is used for the first and second replay of a given root path, and the operator changes the offsets and torch angles for the second pass, the offsets and torch angles of the first pass must also be changed to match those of the second pass. However, it has been found that using the same pose data for the first and second replays of a path causes unexpected and undesirable results.

Once the software of the present invention is loaded into a programmable, industrial robot, a user may program a multiple pass weld by following the steps below.

Step 1: Load the "Multi" (shown in Exhibit A) system module into memory using the file open command in the program window.

Step 2: Use the example program (Example 1) to write a routine to weld a particular part or workpiece. The program should include appropriate instructions so that personnel may safely enter and exit the actual weld area.

Step 3: Using the one or more keys (such as the "Mode-Pos" key) on the teach pendant, modify all positions in the routine including the ArcStartPth, ArcEndPth, and any ArcL instructions in the weld path.

Step 4: Move the robot to a safe position and start the routine from the beginning. As the robot performs the root pass, a message is displayed on the teach pendant "recording path."

Step 5: Once the program executes the first replay instruction, the operator is prompted to make one of 3 selections: (change), (check), (weld)

If "change" is selected, a screen appears that shows the operator the current values for Z offset, Y offset, X rotation, and Y rotation that are stored in the pose data used in the instruction. The operator then has the opportunity to change any or all of these variables. If a change is made, the robot will move to a location representative of the newly established offset and rotational information, and the pose data in the instruction will be overwritten. This can be repeated as many times as necessary to achieve the correct offsets and torch angles. When satisfied, the operator can press "done" to return to the previous screen.

If "check" is selected, the robot will move to a position representing the offset and rotational informational currently stored in the pose data used in the instruction. The operator can then use the change function described above to change the offset and rotational information, if necessary.

If "weld" is selected the robot will execute the weld path with whatever offsets and rotational information that currently reside within the pose data in the instruction.

Step 6: After completion of the first offset pass, the operator is given the opportunity to adjust the offsets and torch angles of the next pass in the same fashion as the first or root pass.

Step 7: Once all offset passes have been adjusted the routine can be run in automatic mode (Auto Mode).

It should be understood that the robot is 10 is run in two modes—teach mode and automatic mode. In teach mode the robot is programmed and pauses between program steps. In automatic mode the robot carries out its program without any pauses. Once all passes, i.e., root and subsequent passes, are correctly adjusted, and the system is run in automatic mode, the robot will carry out welds without pausing for operator input. The software module for the ArcStartPth, ArcEndPth, and MultiRePlay instructions is listed in Exhibit A.

While the present invention has been described in what is believed to be the most preferred forms, it is to be understood that the invention is not confined to the particular construction and arrangement of the components and steps herein illustrated and described, but embraces such modified forms thereof as come within the scope of the appended claims.

What is claimed is:

1. A method of multiple pass welding using a programmable, industrial robot having a memory, a data processor, a robot arm, and a welding torch which is coupled to the robot arm, the method comprising the steps of:

inputting a first path and a positional increment to the data processor of the programmable, industrial robot and storing the positional coordinates of the first path in the memory;

making a first pass of a workpiece by moving the welding torch by means of the robot arm along the first path and storing a second path which is offset from the first path by the positional increment, the welding torch being positioned at a predetermined angle with respect to the workpiece; and making a second pass of the workpiece by moving the welding torch by means of the robot arm along the second path.

2. The method as claimed in claim 1, further comprising: moving the welding torch by means of the robot arm along a third path which is offset from the first path.

3. The method as claimed in claim 1, further comprising the step of inputting an angle increment into the data processor before the welding torch has moved along the first path, wherein the input causes the robot arm to change the angle of the welding torch with respect to the workpiece before the second pass is made.

4. A method of programming a programmable, industrial robot to perform a multiple pass weld, the programmable industrial robot having a memory, a data processor, a robot arm, and a welding torch which is coupled to the robot arm, the method comprising:

inputting a first set of instructions to the data processor of the programmable, industrial robot, including a root path and left and right weave positions of the welding torch;

moving the welding torch along the root path and storing the averages of the left and right weave positions of the welding torch as it is moved along the root path as positional coordinates in the memory, the welding torch being positioned at a predetermined angle with respect to a workpiece;

moving the welding torch by means of the robot arm along a first offset path which is offset from the root path by an offset;

inputting one or more positional increments into the data processor;

repeating the step of inputting one or more positional increments until the offset from the root path is at a desired amount; and moving the welding torch by means of the robot arm along a second offset path which overwrites the first offset path.

5. The method as claimed in claim 4, further comprising:

moving the welding torch by means of the robot arm along a third path which is offset from the first path.

6. The method as claimed in claim 4, further comprising inputting an angle increment into the data processor before the welding torch has moved along the root path, wherein the input causes the robot arm to change the angle of the welding torch with respect to the workpiece before the welding torch is moved along the first offset path.

* * * * *